United States Patent [19]

Dieter et al.

[11] Patent Number: 5,200,447
[45] Date of Patent: Apr. 6, 1993

[54] METHOD OF DECREASING FORMALDEHYDE CONTENT IN ORGANIC PAINT COATING SYSTEMS

[75] Inventors: Jerry A. Dieter, Rochester; Chester P. Jarema, Sterling Heights, both of Mich.

[73] Assignee: Grow Group, Inc., New York, N.Y.

[21] Appl. No.: 896,759

[22] Filed: Jun. 10, 1992

Related U.S. Application Data

[60] Division of Ser. No. 813,898, Dec. 23, 1991, Pat. No. 5,140,058, which is a continuation of Ser. No. 542,302, Jun. 22, 1990, abandoned.

[51] Int. Cl.$^5$ .................... C08K 5/32; C08G 12/04; B01D 3/34
[52] U.S. Cl. .................... 524/259; 528/266; 203/30; 203/38
[58] Field of Search .................... 524/259; 203/30

[56] References Cited

PUBLICATIONS

Young Hwan Park, "Scavenger Treatment for Reducing Formaldehyde Content in Resin-finished Fabrics", Han'guk Somyu Konghakhoechi 23(3), 215-25, 1986. CA 106(8): 51612r, 1986-abstract of R.

Primary Examiner—Joseph L. Schofer
Assistant Examiner—Wu C. Cheng
Attorney, Agent, or Firm—Brooks & Kushman

[57] ABSTRACT

Described is A method of decreasing the formaldehyde content in an organic paint containing composition comprising the steps of adding to the organic paint containing composition an effective amount of an organic nitrogen containing formaldehyde fixating agent. Suitable nitrogen fixating compositions are nitro parafins, nitro alcohols, amino alcohols, and nitrogen heterocyclic compounds containing from 5 to 8 members in a ring and further containing from 1 to 3 nitrogen atoms per ring and optionally including oxygen atoms present in the ring.

7 Claims, No Drawings

METHOD OF DECREASING FORMALDEHYDE CONTENT IN ORGANIC PAINT COATING SYSTEMS

This is a division of copending application Ser. No. 07/813,898, filed on Dec. 23, 1991, now U.S. Pat. No. 5,140,058, which is a continuation of application Ser. No. 542,302, filed Jun. 22, 1990, now abandoned.

TECHNICAL FIELD

The present invention is concerned with the field of decreasing formaldehyde content in organic paint containing systems. More specifically, the invention is concerned with the increased recovery of organic solvents used in the paint industry.

BACKGROUND OF THE INVENTION

U.S. Pat. No. 4,323,624, Hunsucker et al., discloses a method of preparing wrinkle resistant fabrics by impregnating a fabric with a curable urea formaldehyde resin and a catalyst therefor, and a nitro alkanol. Similarly, U.S. Pat. No. 4,431,699, Hunsucker, discloses a composition for treating textiles and non-woven cellulosic products using a similar composition.

SUMMARY OF THE INVENTION

The present invention is concerned with a method of decreasing the formaldehyde content in an organic paint containing composition by adding thereto an effective amount of an organic nitrogen containing formaldehyde fixating composition.

The case is also concerned with an organic paint containing composition comprising an organic paint and an effective amount of an organic nitrogen containing formaldehyde fixating composition.

The case is also concerned with the composition obtained from the purging of paint spray guns with an organic solvent for the paint where the composition contains an effective amount of an organic nitrogen containing formaldehyde fixating composition.

The case is also concerned with the product resulting from the distillation of the composition comprised of organic solvent from the purge process and the organic paint from the paint application equipment, e.g., spray gun. The invention is also concerned with the method of increasing the yield of the distillation of said product.

The invention is also concerned with the reuse of the distillate as an organic solvent for purging the organic paint application equipment, e.g., spray gun, useful for spraying organic paints. The fixating agent decreases the free formaldehyde present.

DESCRIPTION OF PREFERRED EMBODIMENTS

In the transportation industry, particularly the automotive and truck assembly operation, organic paints are applied to desired substrates. Frequently, these paints contain free formaldehyde by virtue of the presence of formaldehyde-type polymers that are useful in the coatings applied to the transportation products. By organic paint it is meant an organic solvent containing an organic coating with or without pigment useful for the transportation industry.

The coating compositions that are frequently applied are organic solvent soluble materials such as alkyds, acrylics, polyesters, epoxys, polyamides, polyurethanes, amino resins, melamine resins, ureaformaldehyde resins, phenol-formaldehyde resins and the like and mixtures thereof. The polymeric materials can be thermoplastic or thermoset as desired. Such coating compositions have been described, for example, in U.S. Pat. No. 4,049,599, herein incorporated by reference. That patent is entitled "HIGH SOLIDS POLYESTERS CAPABLE OF DISSOLVING IN AN ORGANIC SOLVENT".

Other coating systems which employ blocked acid catalysts are described in a number of U.S. patents, hereby incorporated by reference, namely, U.S. Pat. Nos. 4,835,227; 4,839,427; 4,812,506; 4,482,698; 4,192,826; and 4,351,935.

In general however, the invention herein is generally concerned with organic paints that use organic solvents. By organic solvents are meant the aliphatic or aromatic solvents. These solvents could be aliphatic alcohols such as methanol, ethanol, propanol, butanol ethylhexyl alcohol and the like. It also includes ketones such as acetone, methyl ethyl ketone, methylisobutyl ketone, methyl amyl ketone, diacetone alcohol and the like. Included in aliphatic solvents would be the aliphatic esters such as ethyl acetate, isopropyl acetate, butyl acetate, isobutyl acetate and the like. Also included in solvents are the glycol ethers such as methoxyethanol, methoxyethoxyethanol, ethoxyethanol, butoxyethanol, butoxyethoxyethanol and the like. Other solvents could be the glycols such as ethylene glycol, propylene glycol, hexylene glycol, and the like. Aromatic solvents include benzene, toluene, xylene and the like. Other possible solvents may be VM & P naphtha, mineral spirits, aliphatic distillates and the like.

Suitable organic solvents that may be utilized in the present invention are described in U.S. Pat. No. 4,265,944, which is hereby incorporated by reference.

In the application of organic paints to desired substrates, generally the paints are applied by the spraying technique. In switching from one paint to the next through the paint spray gun, it has been found highly desirable, particularly in automated systems, that the paint that is present in the gun be purged or washed with a solvent for the paint in order to clean the gun. This is generally described as purging the paint spray gun of the paint that has collected in the gun during the normal painting operation. The organic solvent that goes through the spray gun as well as the paint from the spray gun is collected.

It has been found that the sprayed paint contains free formaldehyde when such materials are used in the coating compositions. Also, the paint tends to generate formaldehyde during processing. Correspondingly, formaldehyde is also present in the purged liquid from the paint spray gun.

A feature of this invention therefore pertains to the addition of an organic nitrogen containing formaldehyde fixating composition to the solvent that is used in the purging of the paint spray gun.

By fixating it is meant to "fix" the formaldehyde that is present in the composition. By "fix" it is meant to cause formaldehyde, which is an unreacted compound in the composition to combine into another chemical compound. Alternatively, "fix" means to retard volatilization or evaporation of the formaldehyde from the composition containing the solvent from the cleaned spray gun.

The organic nitrogen containing formaldehyde fixating compounds can broadly be classified as aliphatic and aromatic nitrogen containing compounds that are soluble in the paint advent. The materials can be nitroparafins, nitroalcohols, amino alcohols, and nitrogen heterocyclic compounds of from 5 to 8 atoms per ring, containing 1-3 nitrogen atoms per ring, and up to two fused rings and the like. The heterocyclic rings optionally may contain oxygen.

The nitro parafins can be described as lower alkanes of from 1 to 6 carbon atoms containing nitro-groups attached on the chain such as nitromethane, nitroethane, nitropropane and the like.

The nitro alcohols are aliphatic alcohols having 1 to 6 carbon atoms in the aliphatic chain further containing a hydroxy group, a nitro group and the like, such as 2-nitro-2-methyl-1-propanol; 2-nitro-2-ethyl-1,3-propanediol; tris(hydroxymethyl)nitromethane; 2-nitro-1-butanol, and the like. The amino alcohols can generally be characterized as aliphatic alcohols having from 1 to 6 carbon atoms further substituted by a hydroxy group and an amino group on the aliphatic backbone such as 2-amino-2-methyl-1-propanol; 2-amino-2-methyl-1-propanol; 2-amino-2-ethyl-1,3-propanediol; tris(hydroxymethyl)aminomethane; 2-dimethyl-amino-2-methyl-1-propanol; 2-amino-1-butanol; 2-amino-2-methyl-1,3-propanediol and the like. The heterocyclic materials may contain one or more of the following ring systems, namely, pyridine, piperidine, piperizine, benzoxazine, oxazoline, oxazolidine, triazine, imidazoline and the like. The nitrogen heterocyclic rings could be substituted with various moieties as long as the moieties do not prevent the nitrogen heterocyclic material from being soluble in the organic solvent. Suitable substitutions on the nitrogen heterocyclic ring would include alkyl of from 1 to 6 carbon atoms, hydroxyalkyl of from 1 to 6 carbon atoms, hydroxyalkoxy, hydroxyalkoxy alkylene materials having 1-6 carbon atoms, and the like.

The nitrogen containing organic formaldehyde fixating composition is added in amounts of 0.01 to 10% by weight of the total composition, preferably about 0.2 to about 5% by weight, and even more preferably, about 0.25 to about 2% by weight.

It has been found that during the processing of the organic solvent in the recovery of the organic solvent from the paint, a distillation process is utilized. The distillation occurs at ambient pressure, although a partial vacuum may be pulled such as a pressure of sub-atmospheric, generally from about 0.1 to 0.95 atmospheres. The temperature may range from about 120° F. to about 275° F., depending on solvent. It is to be appreciated that the temperature and pressure can be varied to increase the overall efficiency of the distillation process.

The selection of the organic nitrogen containing formaldehyde fixating composition will also depend upon the catalyst that is present in the formaldehyde containing coating composition. For example, it has been found that when certain acids are present in the coating composition and in particular para-toluene sulfonic acid (PTSA), that certain nitrogen organic materials have a tendency to block the acid. By this it is meant that the paint composition that contains the PTSA in the block form permits the composition to remain uncatalyzed until a particular temperature is reached, when the PTSA becomes unblocked thereby accelerating the curing of the paint composition. The presence of the blocked PTSA in the purged paint spray gun solution and in the distillate likewise will become unblocked, causing increasing concentrations of formaldehyde.

Having described the invention above, listed below are exemplifications of the invention where all parts are in parts by weight and all temperatures are in degrees Centigrade unless otherwise indicated.

EXAMPLE 1

The following series of experiments in organic solvent purge thinner containing the following composition:

| Components | Percent By Volume |
|---|---|
| methyl isobutyl ketone | 20% |
| n-butylacetate | 7% |
| acetone | 28% |
| Super Hi Flash (trademark of Unocal for an aromatic naphtha solvent) | 10% |
| xylene | 35% |

The aforementioned thinner was blended with a clear top coat organic paint identified as Dupont RK7103 (Trademark of Dupont for a melamine formaldehyde acrylic clear top coat). The blended mixture contained 70% of the organic thinner and 30% of the clear top coat resulting in a composition having a total active solids content of 15% by weight. This mixture was distilled at atmospheric pressure in the presence of various organic nitrogen containing formaldehyde fixating compositions. Different fractions were taken during the distillation to determine the concentration of the formaldehyde at different particular times. The fractions were collected at temperature ranges of 145°-162° F. (fraction 1), 162°-174° F. (fraction 2) and 174°-271° F. (fraction 3). The amount of formaldehyde in the distillate for the three fractions and for the different nitrogen containing formaldehyde fixating agents is described below:

TABLE I

| | Formaldehyde present (parts per million-ppm) | | |
|---|---|---|---|
| Additive | Fraction 1 | Fraction 2 | Fraction 3 |
| None | 655 | 1827 | 6548 |
| 1% AMP95 | 0 | 0 | 0 |
| 1% AEPD | 0 | 0 | 338 |
| 1% NiPar640 | 520 | 2263 | 6770 |
| 0.1% DMEA | 996 | 1660 | 5990 |

AMP95 is a mixture of 95% by weight AMP with 5% water where AMP is 2-amino-2-methyl-1-propanol.
AEPD means 2-amino-2-ethyl-1,3-propanediol.
NiPar640 means 1-nitropropane.
DMEA is dimethylaminoethanol.

For comparison purposes, the distillate obtained from a commercial solvent reclaiming operation which distilled the composition resulting from washing spray guns which sprayed the DuPont RK7103 paint with the solvent purge material identified above contained 806 ppm of formaldehyde.

EXAMPLE 2

In this experiment, it was determined the percent increase in the yield of distillate using various organic nitrogen containing formaldehyde fixating compositions. A melamine formaldehyde acrylic resin for coating compositions was sprayed through spray guns and rotating bells at an automotive painting facility. The purge composition of Example 1 was used to purge the equipment and the resulting composition was collected.

This collected material was analyzed and determined to have a concentration of formaldehyde as listed in Table II. This collected material likewise was distilled at 145° F. to 275° F. temperature and a pressure of 1 ATM and a determination made of formaldehyde content in the distillate as well as the percent yield from the distillation after various formaldehyde fixating compositions were added. The data is shown in Table II.

TABLE II

| Additive | ppm formaldehyde in distillate | % yield from distillation |
| --- | --- | --- |
| none | 3075 concentration prior to distillation | — |
| none | 4995 | 42.7 |
| 1% by wt. AEPD | 0 | 48.2 |
| 1% by wt. AMP95 | 0 | 56.6 |
| 1% by wt. AMP | 0 | 60.7 |

These experiments not only demonstrate the use of the organic nitrogen containing formaldehyde fixating compositions in decreasing the formaldehyde in the distillate but also demonstrates a significant increase in the yield of the distillate. The amount of distillate that is obtained is increased to a substantial amount by utilizing the fixating agents.

EXAMPLE 3

The following tests were made utilizing the collected material of Example 2, which is a mixture of solvent purge and, from the spray gun, the organic paint (hereinafter collected purge material). The composition was subjected to distillation with the addition of fixating agents. The mixture was distilled at 150° F.–250° F. with pressures of 0.5–0.8 ATM pressure on a continuous distillation apparatus (thin film evaporator). Each run was sampled midway through the distillation. The results are indicated in Table III.

TABLE III

| Run | Additive | ppm formaldehyde in distillate |
| --- | --- | --- |
| a. | 1% AEPD | 0 |
| b. | None | 2676 |
| c. | 1% AMP95 | 0 |

This test shows that the addition of fixating agents decrease the concentration of detectable formaldehyde which is significant as shown in Run b. Each run used about 5 gallons of collected purge material.

EXAMPLE 4

Using the mixture of purge and organic paint of Example 3 (collected purge material), an additive was added which contained AMP and acetone which was added to increase solubility of the AMP. The result of the distillation following the procedures of the examples are as follows in Table IV:

TABLE IV

| Additive | formaldehyde in distillate (ppm) |
| --- | --- |
| 0.5% by wt. AMP in acetone (95% AMP:5% acetone) | 224 |
| 1% by wt. AMP in acetone (95% AMP:5% acetone) | 440 |
| None (End of run) | 1517 |

Another commercial sample was obtained and the above procedures were followed with the results:

| Additive | formaldehyde in distillate (ppm) |
| --- | --- |
| 0.5 | 70 |
| 1.0 | 0 |
| None | 860 |

EXAMPLE 5

The 1% AMP95 distillate of Example 3 was blended with a mixture of purged paint and solvent (collected purge material) of Example 3 to ascertain if the effects of the fixating agent would continue to decrease the formation of formaldehyde in subsequent distillation runs. The purpose of this experiment is to determined if the AMP can prevent the formation of formaldehyde from the collected purge material during distillation. A 1:1 ratio of the two distillates was blended together and distilled at 145° F.–250° F. and a pressure of 0.5–0.8 ATM, with the results shown below.

TABLE V

| Additive | formaldehyde ppm in distillate |
| --- | --- |
| None | 1266 |
| 1:1 collected purge material and 1% by wt. AMP distillate | 182 |

The above results indicate that the effects of the nitrogen containing formaldehyde fixating agent decreases the presence and/or formation of formaldehyde after subsequent distillation as shown above.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method of increasing the yield in the distillation of an organic paint in a solvent therefor comprising the steps of:
   a. providing a composition comprised of organic paint from paint application equipment that has been purged with a solvent for the paint;
   b. adding to the composition of step a, an effective amount of an organic nitrogen containing formaldehyde fixating agent, thereby decreasing the formaldehyde content of the composition;
   c. distilling the composition of step b; and
   d. recovering the distillate.

2. The method of claim 1 wherein the organic paint is selected from the group consisting of alkyds, acrylics, polyesters, polyamides, polyethers, polyurethanes, amino resins, melamine resins, ureaformaldehyde resins, phenol-formaldehyde resins and mixtures thereof.

3. The method of claim 1 wherein the fixating agent is present in an amount of 0.01 to 10% by weight of the total composition.

4. The method of claim 1 wherein the fixating agent is selected from the group consisting of nitro parafins, nitro alcohols, amino alcohols, and nitrogen heterocyclic compounds having from 5 to 8 atoms per ring with 1-3 nitrogen atoms per ring.

5. The method of claim 1 wherein the fixating agent is an amino alcohol.

6. The method of claim 1 wherein the fixating agent is a nitrogen heterocyclic compound having from 5 to 8 atoms per ring with 1-3 nitrogen atoms per ring.

7. The method of claim 1 wherein the fixating agent is 2-amino-2-methyl-1-propanol.

* * * * *